United States Patent
Jäger

(10) Patent No.: US 7,077,606 B2
(45) Date of Patent: Jul. 18, 2006

(54) ROTATING CHIP REMOVING TOOL, SUCH AS A DRILLING AND CHAMFERING TOOL, WITH CUTTING INSERTS, AND A MILLING CUTTER WITH CUTTING INSERTS

(75) Inventor: Horst Jäger, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/860,805

(22) Filed: Jun. 3, 2004

(65) Prior Publication Data

US 2005/0019119 A1    Jan. 27, 2005

Related U.S. Application Data

(63) Continuation-in-part of application No. PCT/EP02/13572, filed on Dec. 2, 2002.

(30) Foreign Application Priority Data

Dec. 4, 2001  (DE) ................ 101 59 512

(51) Int. Cl.
B23B 51/00   (2006.01)
B23B 51/02   (2006.01)

(52) U.S. Cl. ..................... 408/191; 408/186
(58) Field of Classification Search ........ 408/186–189, 408/191, 196–198, 223–225, 713; 407/113, 407/48, 103; B23B 51/00, 51/02
See application file for complete search history.

(56) References Cited

U.S. PATENT DOCUMENTS

| 4,693,641 | A | * | 9/1987 | Tsujimura et al. ........... 407/42 |
| 4,844,669 | A | * | 7/1989 | Tsujimura et al. .......... 408/188 |
| 4,850,757 | A | * | 7/1989 | Stashko ..................... 408/179 |
| 4,913,604 | A | | 4/1990 | Zaengerle |
| 5,052,863 | A | * | 10/1991 | Satran ........................ 407/113 |
| 5,244,318 | A | * | 9/1993 | Arai et al. ................... 407/42 |
| 5,314,269 | A | * | 5/1994 | Arai et al. ................... 407/42 |
| 5,685,670 | A | | 11/1997 | Satran |
| 5,791,831 | A | * | 8/1998 | Shimano et al. ............ 407/113 |
| 5,800,100 | A | * | 9/1998 | Krenzer ...................... 408/224 |
| 5,829,927 | A | | 11/1998 | Nakamura et al. |
| 5,915,895 | A | * | 6/1999 | Jager et al. ................. 408/225 |
| 6,595,729 | B1 | * | 7/2003 | Karlsson ..................... 408/118 |
| 6,773,209 | B1 | * | 8/2004 | Craig .......................... 407/63 |
| 6,884,006 | B1 | * | 4/2005 | Nagashima ................. 407/34 |
| 2003/0170079 | A1 | * | 9/2003 | Daiguji et al. .............. 407/34 |
| 2003/0223833 | A1 | * | 12/2003 | Roman ....................... 408/224 |
| 2005/0047882 | A1 | * | 3/2005 | Karisson et al. ........... 408/191 |

FOREIGN PATENT DOCUMENTS

| DE | 41 16 114 A1 | 11/1992 |
| DE | 92 01 113.6 | 4/1993 |
| DE | 197 40 415 A1 | 1/2003 |
| EP | 0798065 A | 10/1997 |
| EP | 1002608 A | 5/2000 |
| GB | 1092663 A | 11/1967 |
| JP | 55144907 A | * 11/1980 |

* cited by examiner

Primary Examiner—Boyer D. Ashley
Assistant Examiner—J Williams
(74) Attorney, Agent, or Firm—Nils H. Ljungman & Associates

(57) ABSTRACT

A rotating chip removing tool, such as a drilling and chamfering tool, and a milling cutter, each of which have at least one cutting insert or cutting plate. The cutting plate has a guide recess that adjoins the underside of the cutting plate. A plate seat for accommodating the cutting plate is provided on a tool body of the chip removing tool and has a guide fillet or surface which corresponds to the guide recess.

20 Claims, 13 Drawing Sheets

ROTATING CHIP REMOVING TOOL, SUCH AS A DRILLING AND CHAMFERING TOOL, WITH CUTTING INSERTS, AND A MILLING CUTTER WITH CUTTING INSERTS

CONTINUING APPLICATION DATA

This application is a Continuation-In-Part application of International Patent Application No. PCT/EP02/13572, filed on Dec. 2, 2002, which claims priority from Federal Republic of Germany Patent Application No. 101 59 512.3, filed on Dec. 4, 2001. International Patent Application No. PCT/EP02/13572 was pending as of the filing date of this application. The United States was an elected state in International Patent Application No. PCT/EP02/13572.

BACKGROUND

1. Technical Field

This application relates to a rotating chip removing tool with a cutting plate and a tool body, in particular a counterbore or milling cutter.

2. Background Information

For machining that involves chip removal, in particular for metal cutting, a rotating chip removing tool with a cutting plate, in particular an indexable insert, is frequently used. The indexable insert can be fixed to the tool holder in different positions and thus makes it possible to use different cutting edges or different areas of a cutting edge, which increases the useful life of the cutting plate.

The indexable insert or another type of cutting plate can be affixed to a tool body, generally in a clearly defined position. DE 92 011 13 U1, for example, describes a round cutting plate that is held on the tool body in a form-fitting manner. For this purpose, both the cutting plate and the tool body have moldings and recesses that are engaged with one another in a form-fitting connection. The cutting plate can therefore be fastened onto the tool body in different positions that are rotated from one another by a certain angle, but are not turned, in other words flipped so that the upper side and the lower side change places with each other.

A chip removing tool in the form of a rotary-driven counterbore with an indexable insert in the shape of a regular polygon is described in DE 41 16, 114 A1, for example. The indexable insert is thereby oriented symmetrically with respect to the axis of rotation of the tool. A zero-backlash seating of the indexable insert is achieved by a groove in the tool body that runs at a right angle to the axis of rotation. This counterbore, however, has the disadvantage, among other things, that the diameter of the cutting plate must be greater than the diameter of the boring in which the counterbore is producing a bevel.

A bore, counterbore or fretting tool with a cutting plate that is narrower than the boring to be bored is known, for example, from DE 197 40 415 A1. The cutting insert is held in position so that there is zero backlash by a claw chuck, whereby the position of the claw chuck is determined by guide and calibration surfaces on the claw chuck and on the tool body. On the other hand, no means are provided to guarantee that the cutting insert itself will be held in position with the total absence of play or backlash.

EP 0 798 065 A2 describes a drill with two cutting inserts that are each realized essentially in the form of an equilateral triangle. This drill is intended to be used for, among other things, boring into soft materials, and is thereby designed to make possible a reliable withdrawal of the drill core. The cutting inserts are each affixed to the tool body by means of a screw.

A combination bore and milling cutter is described, for example, in WO 942 52 10 A1. This tool has a plurality of adjustable cutting plates, as a result of which it can be adapted to different boring diameters. However, the adjustability of the cutting plates also requires a complex and expensive design and limits the stability of the cutting plate mounting. Moreover, the cutting plates are not realized in the form of indexable inserts.

OBJECT OR OBJECTS

One of the objects of this application is to create a rotating chip removing tool that is particularly well suited for use in, among other things, a counterbore or milling cutter, with an indexable insert.

SUMMARY

One possible embodiment teaches a rotating chip removing tool, i.e. one that can be rotated, with a trapezoidal cutting plate having an upper side and an underside, which has a first trapezoidal limb with a first flank and an active cutting edge, a second trapezoidal limb with an inactive edge that is diametrically opposite the active cutting edge and a second flank, and a trapezoidal base line with a guide recess that adjoins the underside, and a tool body, which for the mounting of the cutting plate, has a plate seat with a guide web corresponding to the guide recess along one plate-seat-base-line edge of the plate seat running parallel to the trapezoidal base line. The trapezoidal cutting plate of the rotating chip removing tool thereby has two trapezoidal limbs, each of which has a surface and an edge, whereby on a first trapezoidal limb there is an active cutting edge and a first flank, and on a second trapezoidal limb there is an inactive edge and a second flank. The inactive edge and the cutting edge are diametrically opposite each other. On the trapezoidal base line, i.e. the longer of the two parallel sides of the trapezoid, there is a guide recess that adjoins the underside of the cutting plate and is designed to mate with a corresponding guide web on a plate seat of the tool body. The guide web extends along a plate seat base line edge of the plate seat that runs parallel to the trapezoidal base line on the indexable insert located on the tool holder.

In one possible realization, the cutting plate may be realized in the form of an indexable cutting insert, whereby the inactive edge is an inactive cutting edge and the second surface is a second flank, and a second guide recess is provided that adjoins the upper side.

While the active cutting edge that is adjacent to the first flank is provided for machining that requires chip removal, in one possible realization, the other, second flank can be supported on a support surface of the tool body that is provided for that purpose. In addition to the guide web on the plate seat, there also can be an additional element that holds the cutting plate in the specified position and further improves the retention of the cutting plate in the desired position. The support surface thereby can be realized so that the cutting plate extends with its second flank partly around to the back of the tool body and grips it from behind, i.e. the cutting plate cannot be removed from the plate seat in a direction of movement which is exclusively perpendicular to the plate seat. This arrangement achieves a particularly accurate and secure guidance of the cutting plate on the tool body.

A particularly simple and simultaneously effective fixing of the cutting plate in position on the tool body can be achieved possibly by a clamp hole. For this purpose both the tool body and the cutting plate have a boring, whereby at least the boring in the tool body is provided with a thread. A dual-thread screw can be used even if the cutting plate has a threaded boring. In other possible embodiments, the cutting plate may be affixed, clamped, or fastened to the tool body by an affixing arrangement, a clamping arrangement, or a fastening arrangement.

The feed direction of the rotating tool may be substantially parallel to the trapezoidal base line of the cutting plate. It is thereby essentially irrelevant whether the rotating tool and/or the workpiece to be processed is/are driven. The chip removing tool or rotating tool can have a narrow, oblong cutting plate, the thickness of which is less than one-quarter of its length and the width of which is less than one-half of the length indicated by the trapezoidal base line. The trapezoidal limbs that carry the cutting edges or the cutting edge and the inactive cutting edge enclose an angle of 30° to 60° with the trapezoidal base line.

To essentially guarantee a particularly stable guidance of the cutting plate or of the cutting insert on the tool body, the guide web on the plate seat and the corresponding guide recess on the cutting plate may extend over one-half of the corresponding dimension of the plate seat on the tool body or the length of the cutting plate. The guide web can be configured so that it does not extend beyond the contour of the cutting plate or of the plate seat without any significant reduction of stability. The guide web thereby tapers, in one possible configuration, toward the trapezoidal limb that has the active cutting edge.

The advantages achieved with the possible embodiments described herein include, among other things, the fact that the chip removing tool makes possible to fix a cutting plate, which is oblong, in position in a particularly simple and stable manner. For this purpose, there is a guide web on the tool body that is oriented substantially parallel to the axis of symmetry of the tool and a corresponding guide recess on the cutting insert.

The chip removing tool can also be realized in the form of a counterbore or milling cutter. A plurality of cutting plates can thereby be oriented symmetrically around an axis of symmetry, whereby along the axis of symmetry a receptacle for a drill can be provided, so that the chip removing tool can be used as a combination bore and milling cutter. When it is realized in the form of a combination bore and milling cutter, a long, extended realization of the cutting plates is particularly appropriate, whereby the cutting plates are oriented essentially parallel to the axis of symmetry. Because the cutting plates are supported on the guide web of the tool body, the cutting plates, without being supported on an insert, in particular a drill, oriented along the axis of symmetry of the chip removing tool, can be supported in a stable fashion at a very small distance or no distance at all from the surface of the insert, in particular a drill. When a drill is used as the central insert in the chip removing tool, it is also possible to position the cutting plates partly inside the boring diameter. To make available sufficient space for, among other things, the mounting of a drill, the guide web that projects from the plate seat is realized so that the guide web, when viewed from overhead on the upper side of the cutting plate mounted on the plate seat, does not project beyond its contour.

In accordance with one other possible embodiment, the tool is a combined drill and chamfering arrangement which utilizes a cutting insert seated in a chamfering collar which is removably attached to the drill body. For combined drilling and chamfering of holes with one tool, different indexable-insert solutions are known. Most all of these designs have one feature in common, namely that for the chamfering job, the cutting insert in the chamfering collar is not optimally fixed and supported in an insert seat or seating area of the chamfering collar. At best, support is usually provided via a bearing face or the back of the drill. However, this has disadvantages because the drill is more or less pushed out of its central position as a result of the effective clamping forces of the insert and during the chamfering operation. This in turn results in less centricity of the produced hole, shorter tool lives of the drill and the cutting insert, as well as less reliability of the entire process. It is therefore advantageous to have an efficient support of the cutting insert in the chamfering collar, without significantly weakening of stability the drill and chamfering collar.

In this possible embodiment, the cutting insert can be supported via a raised part extending towards the back of the drill at an acute angle. This raised part becomes, therefore, primarily a lateral support, but can in addition also secondarily absorb radially acting force components. When considering this lateral support face together with a bottom face of the insert seat, a bearing vee can be imagined through which the cutting forces of the chamfering operation can be introduced with positive locking into the insert carrier.

For an appropriate orientation of the reaction forces when clamping the insert, the insert can be given an approximately trapezoidal geometry. This geometry can for the usual chamfering angles advantageously be designed with two cutting edges. The edge which is not engaged can be covered by the insert seat and thereby protected against the evacuating chips.

The second support of the cutting insert, which acts on the rear side of the cutting insert, can be effected by means of a bearing face arranged below the cutting edge in the area of the flank of the cutting insert. This bearing face can form an acute angle with the support face. The main components of the reaction forces during clamping and cutting are directed, due to this feature, to the above-explained bearing vee and thus promote a stable and safe cutting process. In this way, as a whole, an insert seat statically defined in itself is formed, which does not require any additional bearing face located on the drill. Consequently, this enables a modular construction of the chamfering collar or ring, which can be divided into chamfering cutting inserts and a carrier ring. The advantage of this embodiment lies in the higher flexibility of application. It is possible, for example, to fix different chamfering cutting inserts on one carrier or to exchange worn cutting inserts. Another advantage is the fact that one cutting insert type can be used for different chamfering diameters, which results in savings regarding inventory, number of types, and higher batch sizes in production.

In another possible embodiment, the cutting insert may be asymmetrical.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One exemplary embodiment is explained in greater detail below with reference to the accompanying drawings, in which.

DESCRIPTION OF EMBODIMENT OR EMBODIMENTS

Parts that are identical in all the figures are identified by the same reference numbers.

Figure 1A:
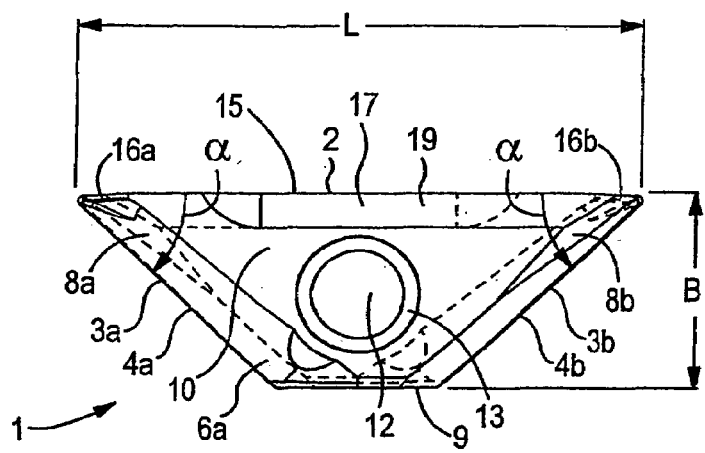
FIGS. 1A–C show an indexable insert of a cutting tool in an overhead view, side view and head-on view, respectively.
Figure 1B:
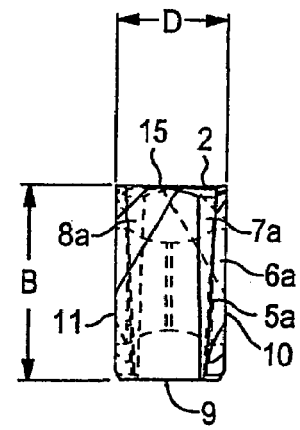
Figure 1C:
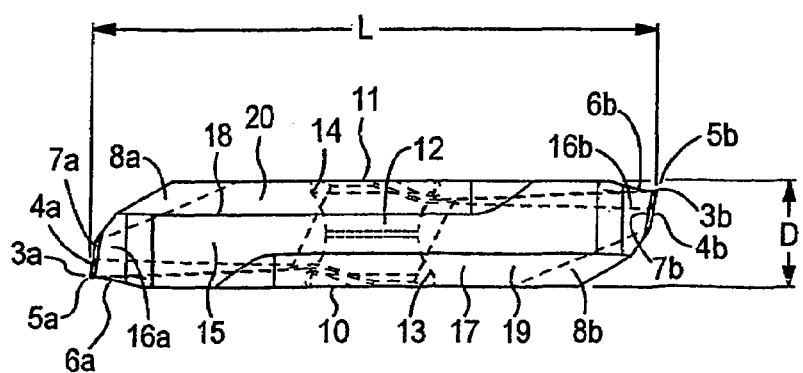
Figure 1D:
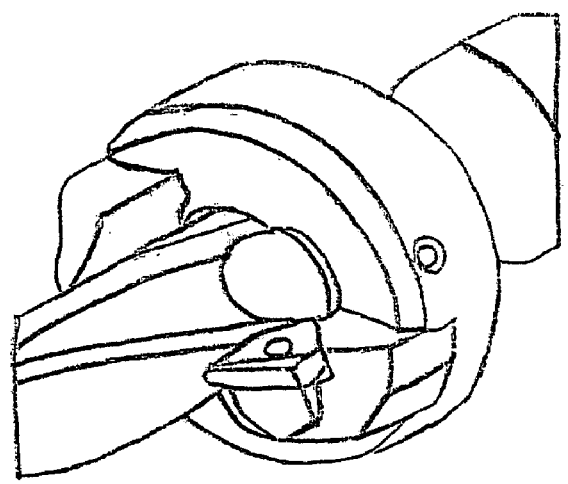
FIG. 1D shows a drilling and chamfering arrangement according to one possible embodiment.
Figure 1E:
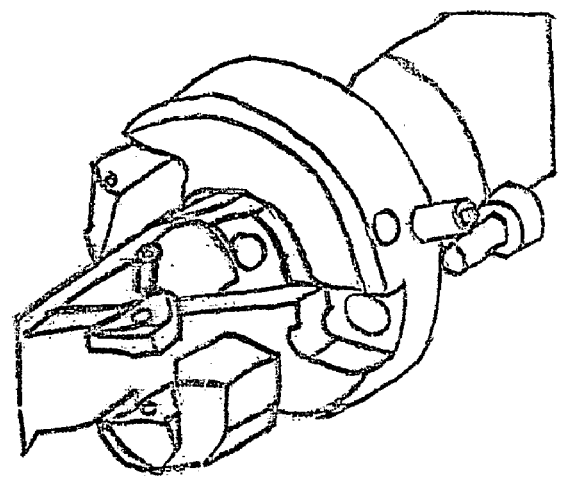
FIG. 1E shows an exploded view of the drilling and chamfering arrangement shown in FIG. 1D according to one possible embodiment.
Figure 2A:
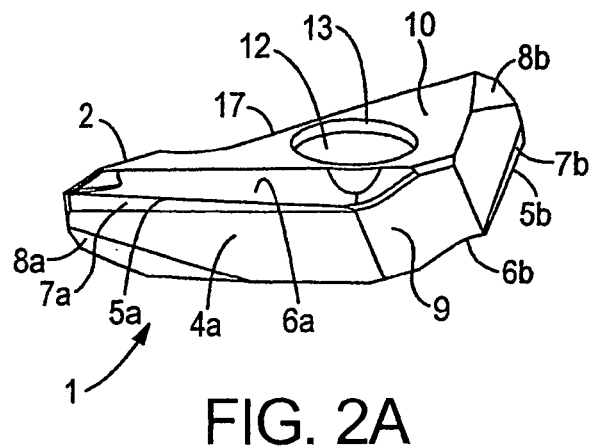
FIGS. 2A–F show the indexable insert illustrated in FIGS. 1A–C from a variety of perspectives.
Figure 2B:
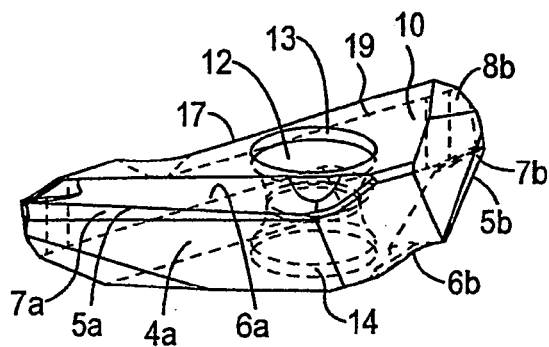
Figure 2C:
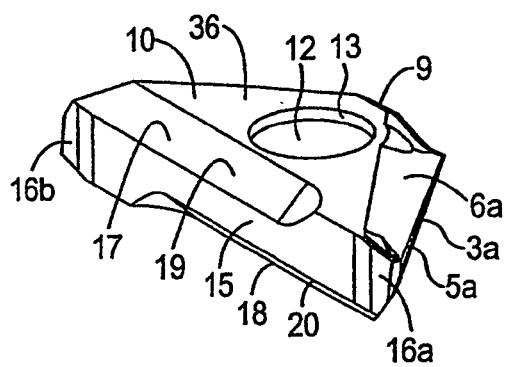
Figure 2D:
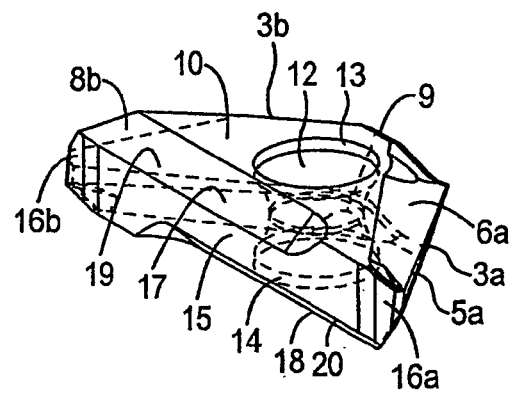
Figure 2E:
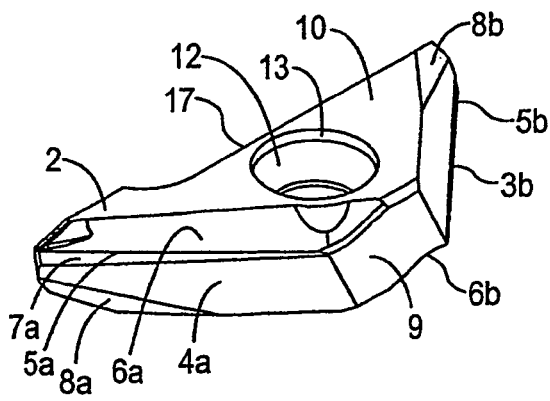
Figure 2F:
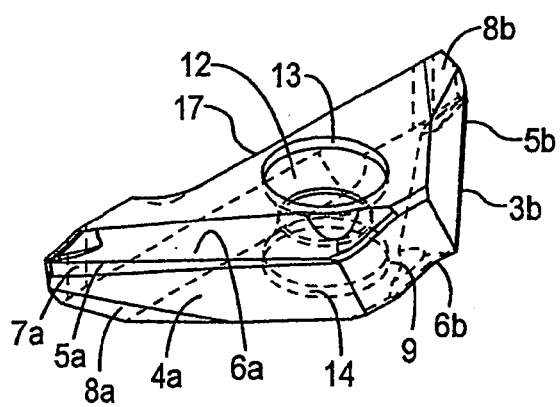

FIG. 1D shows a drilling and chamfering arrangement according to one possible embodiment. FIG. 1E shows an exploded view of the drilling and chamfering arrangement shown in FIG. 1D according to one possible embodiment. In this embodiment, a chamfering collar or ring with two cutting inserts is removably attached to a drill. During operation, the drill initially drills a hole in a workpiece and moves into the workpiece so that the cutting inserts countersink the opening of the hole.

FIGS. 1A to 1C show a number of different views of a trapezoidal cutting plate, which is designated the indexable insert 1 below with a trapezoidal base line 2 having length L and two trapezoidal limbs 3a, 3b, which each enclose an angle a of approximately 45° with the trapezoidal base line 2. On the trapezoidal limbs 3a, 3b, the trapezoidal indexable insert 1 has respective flanks 4a, 4b and cutting edges 5a, 5b. Directly adjacent to the cutting edges 5a, 5b are respective chip flutes 6a, 6b, which run essentially parallel to the respective trapezoidal limbs 3a, 3b, although they become wider along the trapezoidal limb 3a, 3b, the farther they are from the trapezoidal base line 2. The flanks 4a, 4b each have a major cutting edge 7a, 7b. On each of the trapezoidal limbs 3a, 3b, there is also a respective beveled edge 8a, 8b that faces one of the major cutting edges 7a, 7b, runs obliquely in relation to it and adjoins the trapezoidal base line 2.

Opposite the trapezoidal base line 2, the indexable insert 1 is adjoined by an upper surface 9 that is parallel to the trapezoidal base line 2. The indexable insert 1 also has an upper side 10 and an underside 11 that is parallel to the upper side 10. A centrally located boring 12 runs through the upper side and underside 10, 11 and has a beveled edge 13, 14 on the respective sides. On the trapezoidal base line 2, an essentially plane front flank 15, on its sides facing the trapezoidal limbs 3a, 3b, has front bevels 3a, 3b, each of which can comprise a plurality of areas oriented at different angles. In the transitional area between the front flank 15 and the upper side 10 and in the transitional area between the front flank 15 and the underside 11 there are an oblong upper guide recess 17 and lower guide recess 18 that run parallel to the trapezoidal base line 2.

The guide recesses 17, 18 have respective guide surfaces 19, 20 that face the front flank 15 and are oriented at an angle of approximately 45° with respect to the upper side 10 and the underside 11. The guide recesses 17, 18 extend over the greater part of the length L of the trapezoidal base line 2 and adjoin the trapezoidal limb 3b and the trapezoidal limb 3a respectively.

Figure 3A:
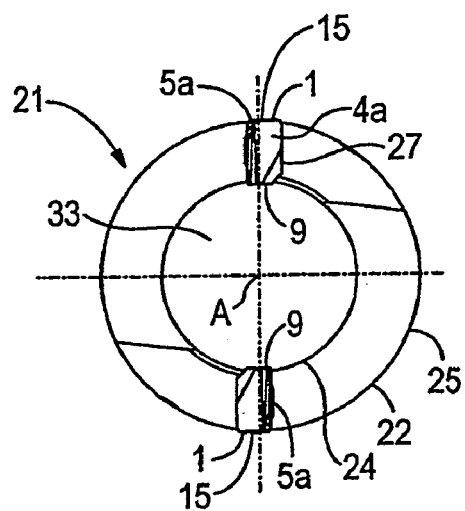
FIGS. 3A–C show a chip removing tool realized in the form of a counterbore with two indexable cutting inserts as illustrated in FIGS. 1A–C and 2A–F in a head-on view and in various side views.
Figure 3B:
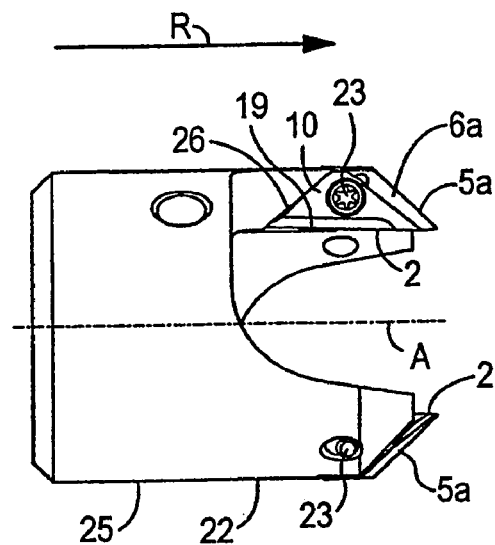
Figure 3C:
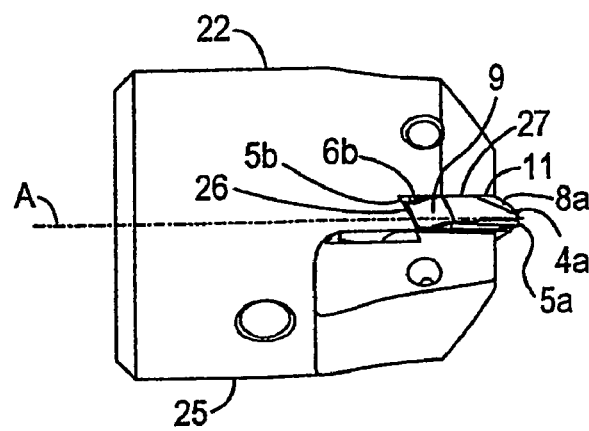

FIGS. 3A to 3C show a chip removing tool 21 that is realized in the form of a counterbore 21 with a tool body 22 and two trapezoidal indexable inserts 1 that are fastened to it, each by means of a screw 23. The tool body 22 is essentially realized in a ring shape for the mounting of a drill (not shown) in an axis of symmetry A. The indexable inserts 1 that are mounted in mirror symmetry on the tool body 22 face an inner periphery 24 of the tool body with their respective front sides 15, and an outer periphery 25 of the tool body 22 with their respective upper surface 9. The active cutting edge 5a located on the first trapezoidal limb 3a, to which the first flank 4a is adjacent, is provided for the application of a beveled edge to a boring in a workpiece (not shown), while the opposite second flank 4b is adjacent to a support surface 26 of the tool body 22 and has the cutting edge 5b, which is inactive in this exemplary embodiment. If the two indexable inserts 1 on the tool body 22 are switched with each other, so that the flanks 4a, 4b and the cutting edges 5a, 5b also switch their respective functions.

Figure 4A:
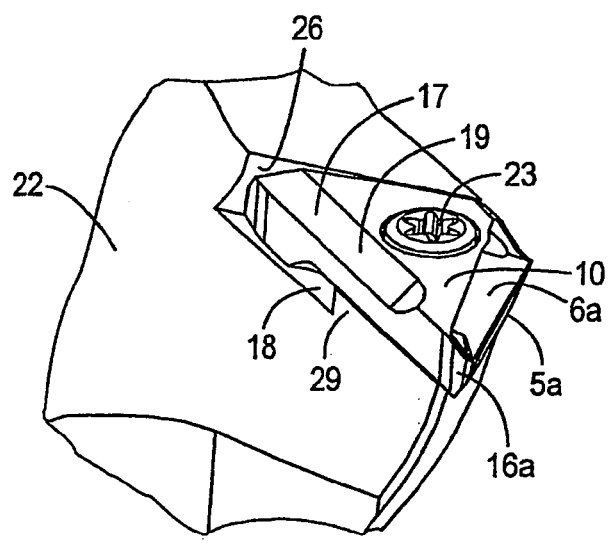
FIGS. 4A–C show a plate seat of a tool body of the chip removing tool illustrated in FIGS. 3A–C with and without the indexable cutting insert in perspective drawings.
Figure 4B:
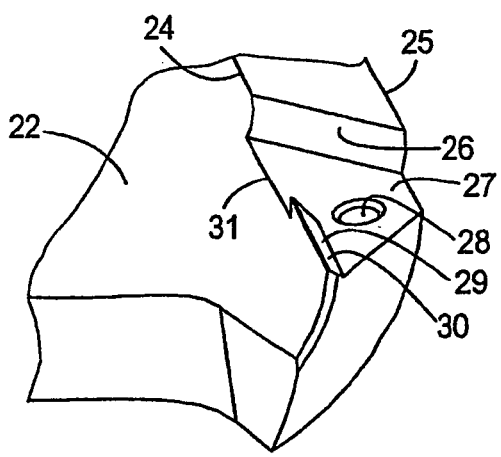
Figure 4C:
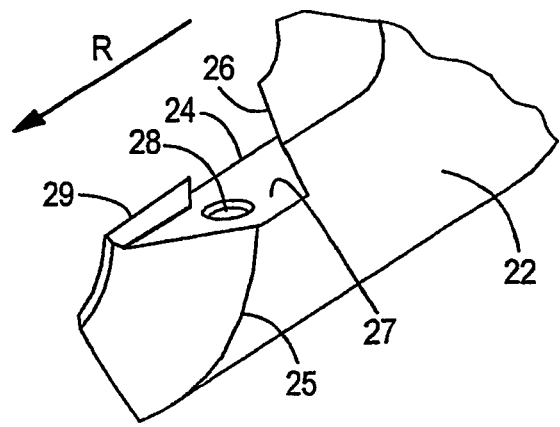
Figure 4D:
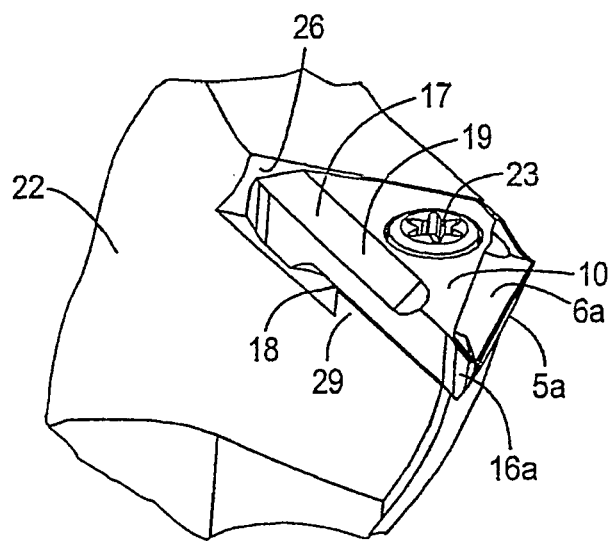

The mounting of the indexable insert 1 on the tool body 22 is illustrated in detail in FIGS. 4A to 4C. A cutting plate seat 27 of the tool body 22 has a threaded boring to receive the screw 23 and, in the vicinity of the inner periphery 24, a guide web 29. The shape of the guide web 29 is adapted to the shape of the guide recesses 17, 18, so that the guide surface 19, 20 is in contact with a guide surface 30 of the guide web 29. Any displacement of the indexable insert 1 toward the inner periphery 24 of the tool body 22, in particular any displacement caused by the chip removal process, can thereby be securely prevented. In this case, particular consideration has been given to the realization that, during the operation of the counterbore 21, a passive force is exerted by the chip removal process on the active cutting edge 5a in the direction of the axis of symmetry A. The guide web 29 makes a significant contribution to holding the indexable insert 1 mounted on the tool body 22 in the specified position in opposition to this passive force.

Figure 5A:
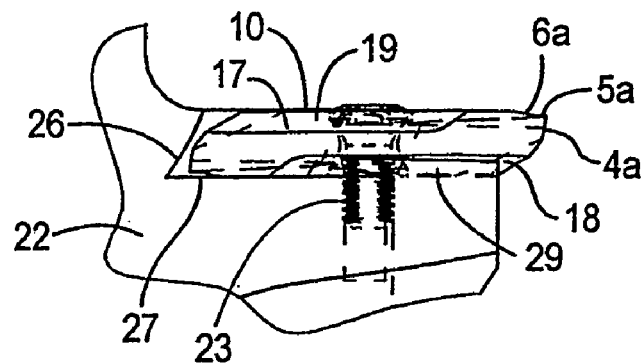
FIGS. 5A–D show the fastening of the indexable insert on a plate seat of the tool body.
Figure 5B:
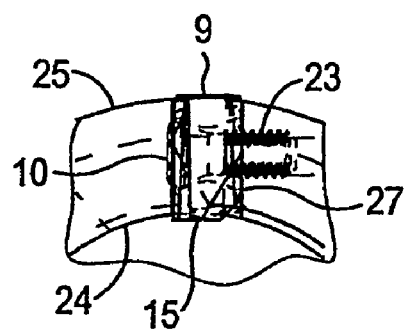
Figure 5C:
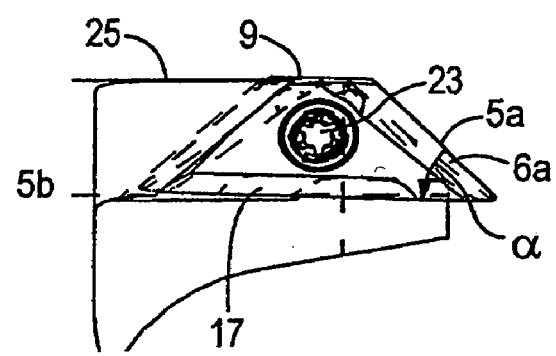
Figure 5D:
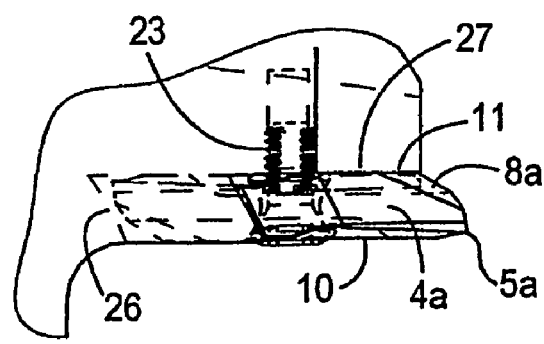
Figure 6A:
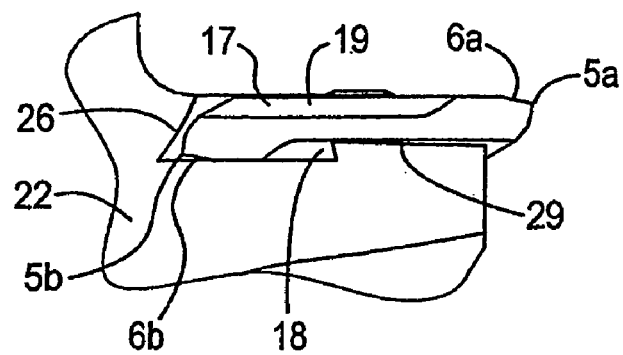
FIGS. 6A–D show details of the tool body of the chip removing tool with indexable insert in views analogous to those in FIGS. 5A–D.
Figure 6B:
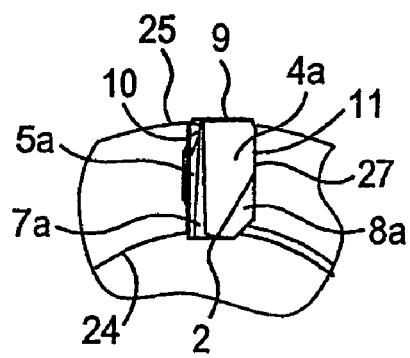
Figure 6C:
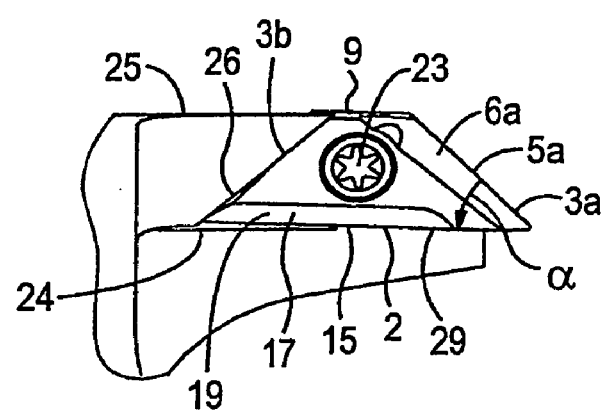
Figure 6D:
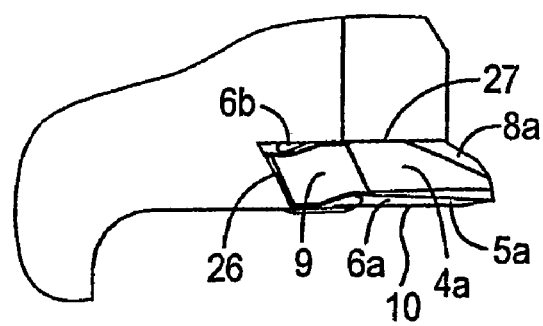

The guide web 29 runs essentially parallel to a plate seat base line edge 31 of the plate seat 27 and tapers toward a plate seat tip 32, which points in a feed direction R toward the chip removing tool 21. Because the guide web 29 extends to the plate seat tip 32, a mechanically very strong fixing of the indexable insert 1 is achieved, in particular in the area of the first trapezoidal limb 3a with the active cutting edge 5a. This support is supplemented by the support of the indexable insert 1 on the support surface 26, which also prevents the indexable insert 1 from rotating around the screw 23 and thereby prevents any displacement of the first flank 4a in the direction of the axis of symmetry. In no case is a direct force exerted by the indexable insert 1 on a drill (not shown) that is being guided in the tool body 22 in a drill receptacle 33. In this case, in the overhead view of the cutting plate 1 shown in FIGS. 5C and 6C, the guide web 29 is located inside the trapezoidal external contour of the cutting insert 1 so that it is in contact with the drill or is partly engaged in the chip flutes of the drill and is thereby positioned inside the diameter of the drill. In this case, no additional recesses in the drill are necessary.

Figure 7A:
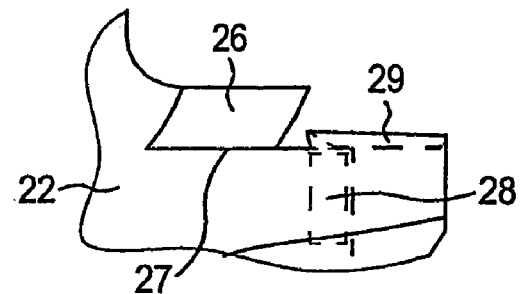
FIGS. 7A–D show details of the tool body in view analogous to those in FIGS. 6A–D, but without the indexable insert, showing concealed contours.
Figure 7B:
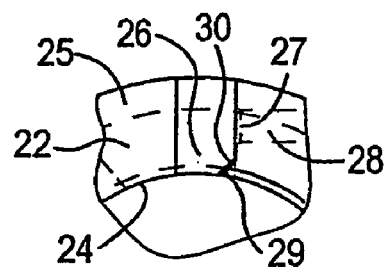
Figure 7C:
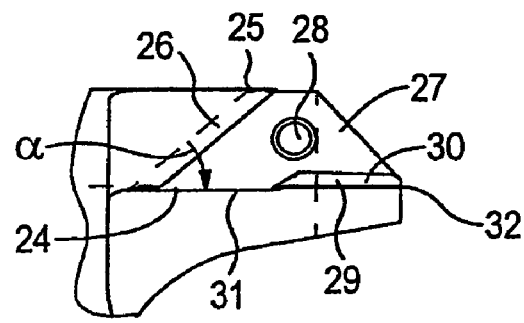
Figure 7D:
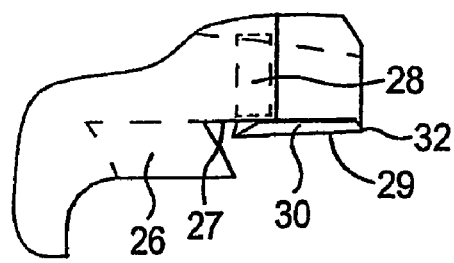
Figure 8A:
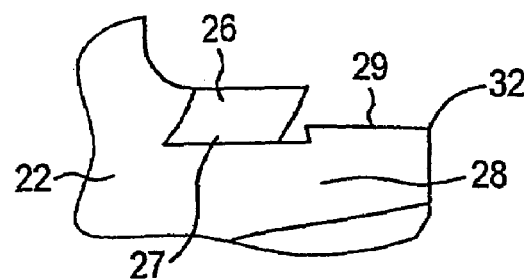
FIGS. 8A–D show details of the tool body in view analogous to those in FIGS. 7A–D, without showing the concealed contours.
Figure 8B:
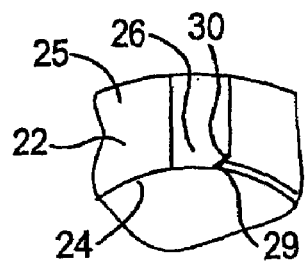
Figure 8C:
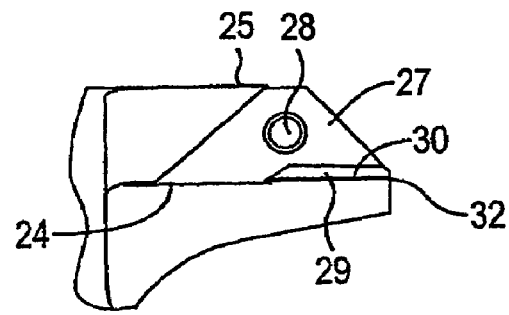
Figure 8D:
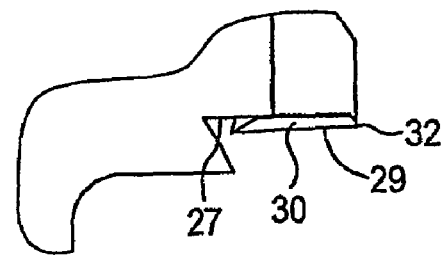

FIGS. 4A–C to 8A–D illustrate, among other things, the configuration of the plate seat 27 and the mounting of the indexable insert 1 on the plate seat 27. FIG. 7C shows particularly clearly, by comparison with FIG. 8C, the undercutting by means of which the indexable insert 1 can be fixed in the correct position in the vicinity of the support surface 26. Because the indexable insert 1 grips the tool body 22 at this point partly from behind, it is possible to reliably prevent cutting forces that are exerted on the active cutting edge 5a from displacing the indexable insert 1 on the tool body 22. The illustrated examples relate to the counterbore 21 illustrated in FIGS. 3A–C, although they can also apply, with appropriate adaptations, to any other type of rotating chip removing tool such as a drill or a combination boring tool and milling cutter.

Figure 9:
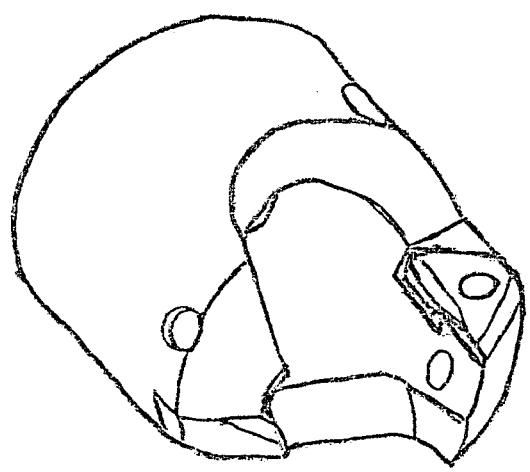
FIG. 9 shows a chamfering collar or ring according to one possible embodiment.
Figure 10:
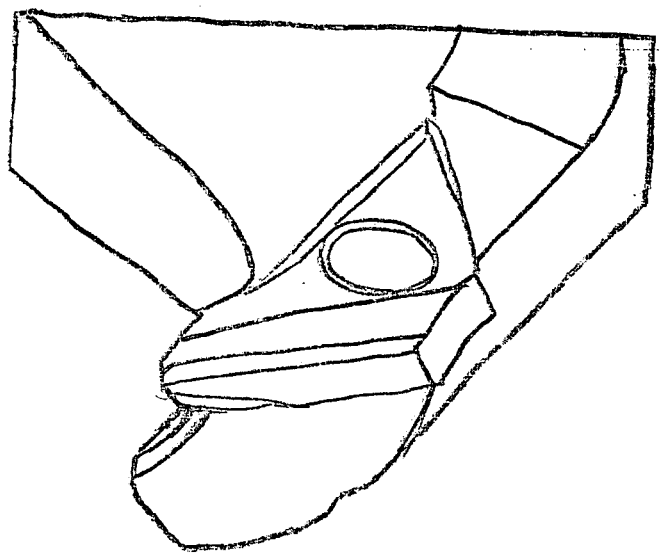
FIG. 10 shows a close-up view of a portion of the chamfering collar shown in FIG. 9 with a cutting insert attached according to one possible embodiment.
Figure 11:
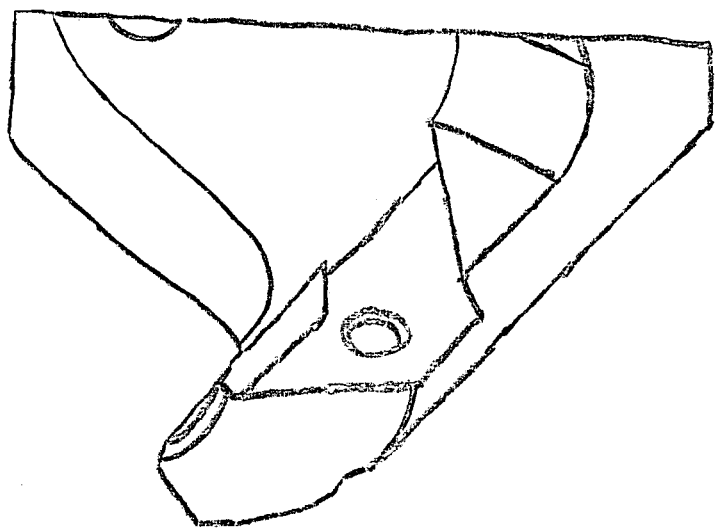
FIG. 11 shows a close-up view of the portion of the chamfering collar shown in FIG. 10 without the cutting insert attached according to one possible embodiment.

FIG. 9 shows a chamfering collar or ring according to one possible embodiment. The chamfering collar may be used in conjunction with a drill or in a milling cutter. FIG. 10 shows a close-up view of a portion of the chamfering collar shown in FIG. 9 with a cutting insert attached according to one possible embodiment. FIG. 11 shows a close-up view of the portion of the chamfering collar shown in FIG. 10 without the cutting insert attached according to one possible embodiment.

Figure 12:
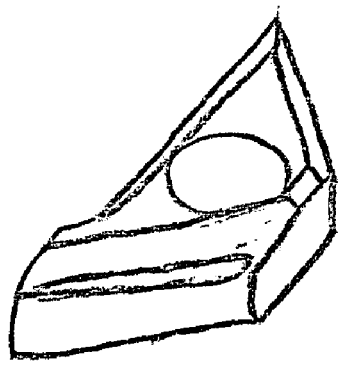
FIGS. 12 and 13 show a perspective view of a cutting insert for use in a cutting tool according to one possible embodiment.
Figure 13:

FIGS. 12 and 13 show a perspective view of a cutting insert for use in a cutting tool according to one possible embodiment.

One feature or aspect of an embodiment is believed at the time of the filing of this patent application to possibly reside broadly in a drilling and chamfering arrangement for drilling and chamfering a countersunk hole in a workpiece, said arrangement comprising: a drill body; at least one cutting insert having a trapezoid shape and being configured and disposed to cut a countersunk hole; said at least one cutting insert comprising a first cutting insert comprising: a trapezoid-shaped upper side and a trapezoid-shaped underside opposite said upper side; a first angled side section comprising: a first flank and a first, active cutting edge; a second angled side section comprising: a second flank and a second, inactive cutting edge disposed diametrically opposite said first, active cutting edge; a front side section and a back side section disposed opposite one another and between said upper side and said underside; said back side section being longer than said front side section; and said back side section comprising a guide recess disposed to adjoin said underside; a chamfering collar being disposed around said drill body and being removably attached to said drill body; said chamfering collar comprising at least one seat being configured to seat a cutting insert; said at least one seat comprising a first seat being configured and disposed to seat said first cutting insert; said first cutting insert being removably attached to said chamfering collar at said first seat; said first seat having an interior edge being disposed immediately adjacent said drill body and being disposed to run parallel to said back side section of said first cutting insert; said first seat comprising a guide projection being disposed to project along a portion of said interior edge of said first seat; and said guide projection being matingly engaged with said guide recess of said first cutting insert to provide a friction fit between said first cutting insert and said first seat, and also being configured and disposed to prevent contact between said drill body and said first cutting insert.

Another feature or aspect of an embodiment is believed at the time of the filing of this patent application to possibly reside broadly in a chamfering arrangement for use with a drill to countersink a hole in a workpiece, said chamfering arrangement comprising: at least one cutting insert having a trapezoid shape and being configured to countersink a hole in a workpiece; said at least one cutting insert comprising a first cutting insert; said first cutting insert comprising: a trapezoidal first side and a trapezoidal second side opposite said first side; a first angled side section comprising: a first flank and a first cutting edge; a second angled side section comprising: a second flank and a second cutting edge disposed opposite said first cutting edge; a first side section and a second side section disposed opposite one another and between said first side and said second side; said second side section being longer than said first side section; and said second side section comprising a guide recess disposed to adjoin said second side; a chamfering collar being configured to be disposed around a drill body and being configured to be removably attached to a drill body; said chamfering collar comprising at least one seat; said at least one seat comprising a first seat being configured and disposed to seat said first cutting insert; said first cutting insert being removably attached to said chamfering collar at said first seat; said first seat having a first edge being configured to be disposed immediately adjacent a drill body and being disposed to run parallel to said second side section of said first cutting insert; said first seat comprising a guide projection being disposed to project along a portion of said first edge of said first seat; and said guide projection being matingly engaged with said guide recess of said first cutting insert to provide a friction fit between said first cutting insert and said first seat, and also being configured and disposed to prevent contact between a drill body and said first cutting insert.

Yet another feature or aspect of an embodiment is believed at the time of the filing of this patent application to possibly reside broadly in a trapezoid-shaped cutting insert for use in a cutting tool, such as a drilling and chamfering arrangement for drilling and chamfering a countersunk hole in a workpiece or a milling cutter for cutting a workpiece, said cutting insert comprising: a trapezoidal first side and a trapezoidal second side opposite said first side; a first angled side section comprising: a first flank and a first cutting edge; a second angled side section comprising: a second flank and a second cutting edge disposed opposite said first cutting edge; a first side section and a second side section disposed opposite one another and between said first side and said second side; said second side section being longer than said first side section; said second side section comprising a guide recess disposed to adjoin said second side; and said guide recess being configured to be matingly engaged with a guide projection of a seat of a cutting tool body to provide a friction fit between said cutting insert and a cutting tool body.

Still another feature or aspect of an embodiment is believed at the time of the filing of this patent application to possibly reside broadly in a chamfering arrangement for use with a drill to countersink a hole in a workpiece, said chamfering arrangement comprising: at least one cutting insert being configured to countersink a hole in a workpiece; said at least one cutting insert comprising a first cutting insert; said first cutting insert comprising a first cutting edge and a guide recess; a chamfering collar being configured to be disposed around a drill body and being configured to be removably attached to a drill body; said chamfering collar comprising at least one seat; said at least one seat comprising a first seat being configured and disposed to seat said first cutting insert; said first cutting insert being removably attached to said chamfering collar at said first seat; said first seat comprising a guide projection; and said guide projection being matingly engaged with said guide recess of said first cutting insert to provide a friction fit between said first cutting insert and said first seat, and also being configured and disposed to prevent contact between a drill body and said first cutting insert.

A further feature or aspect of an embodiment is believed at the time of the filing of this patent application to possibly reside broadly in a milling cutter for cutting a workpiece, said milling cutter comprising: a milling tool body; at least one cutting insert having a trapezoid shape and being configured and disposed to cut a workpiece; said at least one cutting insert comprising a first cutting insert comprising: a trapezoid-shaped first side and a trapezoid-shaped second side opposite said first side; a first angled side section comprising: a first flank and a first, active cutting edge; a second angled side section comprising: a second flank and a second, inactive cutting edge disposed diametrically opposite said first, active cutting edge; a first side section and a second side section disposed opposite one another and between said first side and said second side; said second side section being longer than said first side section; and said second side section comprising a guide recess disposed to adjoin said second side; said tool body comprising at least one seat being configured to seat a cutting insert; said at least one seat comprising a first seat being configured and disposed to seat said first cutting insert; said first cutting insert being removably attached to said tool body at said first seat; said first seat having a first edge being disposed immediately adjacent said tool body and being disposed to run parallel to said second side section of said first cutting insert; said first seat comprising a guide projection being disposed to project along a portion of said first edge of said first seat; and said guide projection being matingly engaged with said guide recess of said first cutting insert to provide a friction fit between said first cutting insert and said first seat.

Another feature or aspect of an embodiment is believed at the time of the filing of this patent application to possibly reside broadly in a cutting arrangement for use in a milling cutter, said cutting arrangement comprising: at least one cutting insert being configured to cut a workpiece; said at least one cutting insert comprising a first cutting insert; said first cutting insert comprising a first cutting edge and a guide recess; a milling tool body comprising at least one seat; said at least one seat comprising a first seat being configured and disposed to seat said first cutting insert; said first cutting insert being removably attached to said milling tool body at said first seat; said first seat comprising a guide projection; and said guide projection being matingly engaged with said guide recess of said first cutting insert to provide a friction fit between said first cutting insert and said first seat.

One feature or aspect of an embodiment is believed at the time of the filing of this patent application to possibly reside broadly in a rotating chip removing tool with a trapezoidal cutting plate 1 having an upper side 10 and an underside 11, which has a first trapezoidal limb 3*a* with a first flank 4*a* and an active cutting edge 5*a*, a second trapezoidal limb 3*b* with an inactive edge 5*b* that is diametrically opposite the active cutting edge 5*a* and a second flank 4*b*, and a trapezoidal base line 2 with a guide recess 18 that adjoins the underside 11, and a tool body 22, which for the mounting of the cutting plate 1, has a plate seat 27 with a guide web 29 corresponding to the guide recess 18 along one plate-seat-base-line edge 31 of the plate seat 27 running parallel to the trapezoidal base line 2.

Another feature or aspect of an embodiment is believed at the time of the filing of this patent application to possibly reside broadly in the rotating chip removing tool, characterized by the fact that the cutting plate 1 is realized in the form of an indexable insert, whereby the inactive edge 5*b* is a cutting edge and the second surface 4*b* is a second flank, and whereby a guide recess 17 is provided which adjoins the upper side 10.

Yet another feature or aspect of an embodiment is believed at the time of the filing of this patent application to possibly reside broadly in the rotating chip removing tool, characterized by a support surface 26 of the tool body 22 that corresponds to the second flank 4*b* of the second trapezoidal limb 3*b* of the cutting plate 1.

Still another feature or aspect of an embodiment is believed at the time of the filing of this patent application to possibly reside broadly in the rotating chip removing tool, characterized by the fact that the cutting plate 1 grips the tool body 22 on its support surface 26 at least partly from behind by means of its second surface 4*b*.

A further feature or aspect of an embodiment is believed at the time of the filing of this patent application to possibly reside broadly in the rotating chip removing tool, characterized by a clamping hole with a boring 12 in the cutting plate 1 and a corresponding threaded boring 28 in the tool body 22.

Another feature or aspect of an embodiment is believed at the time of the filing of this patent application to possibly reside broadly in the rotating chip removing tool, characterized by the fact that a feed direction R is parallel to the trapezoidal base line 2.

Yet another feature or aspect of an embodiment is believed at the time of the filing of this patent application to possibly reside broadly in the rotating chip removing tool, characterized by the fact that the thickness D of the cutting plate 1 is less than one-quarter of its length L.

Still another feature or aspect of an embodiment is believed at the time of the filing of this patent application to possibly reside broadly in the rotating chip removing tool, characterized by the fact that the width B of the cutting plate 1 is less than one-half of its length L.

A further feature or aspect of an embodiment is believed at the time of the filing of this patent application to possibly reside broadly in the rotating chip removing tool, characterized by the fact that the guide recess 17, 18 and the guide web 29 extend over at least one-half the length of the trapezoidal base line 2 or of the plate seat base line edge 31.

Another feature or aspect of an embodiment is believed at the time of the filing of this patent application to possibly reside broadly in the rotating chip removing tool, characterized by the fact that the guide web 29 tapers toward a plate seat tip 32.

Yet another feature or aspect of an embodiment is believed at the time of the filing of this patent application to possibly reside broadly in the rotating chip removing tool, characterized by the fact that the tool body 22 is part of a counterbore 21.

Another feature or aspect of an embodiment is believed at the time of the filing of this patent application to possibly reside broadly in the rotating chip removing tool, characterized by the fact that a plurality of plate seats 27 are arranged symmetrically around an axis of symmetry A.

Yet another feature or aspect of an embodiment is believed at the time of the filing of this patent application to possibly reside broadly in the rotating chip removing tool, characterized by a drill receptacle 33 that is oriented along the axis of symmetry A.

Still another feature or aspect of an embodiment is believed at the time of the filing of this patent application to possibly reside broadly in the rotating chip removing tool, characterized by the fact that the guide web 29, when viewed from overhead on the upper side 10 of the cutting plate 1 held on the plate seat 27, does not extend beyond its contour.

Yet another feature or aspect of an embodiment is believed at the time of the filing of this patent application to possibly reside broadly in a rotating chip removing tool 21 comprises a trapezoidal cutting plate 1 with a first trapezoidal limb 3a, which has a first flank 4a and an active cutting edge 5a, and with a second trapezoidal limb 3b, which has an inactive edge 5b that is diametrically opposite the active cutting edge 5a and has a second flank 4b. A trapezoidal ground line 2 of the trapezoidal cutting plate 1 has a guide recess 18 that adjoins the underside 11 of the cutting plate. A plate seat 21 for accommodating the cutting plate 1 is provided on a tool body 22 of the chip removing tool 21 and has a guide fillet 29, which corresponds to the guide recess 18, on a plate seat ground line edge 31 running parallel to the trapezoidal ground line 2.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the Preliminary International Examination Report dated Sep. 16, 2003, the International Search Report dated Apr. 8, 2003, the German Office Action dated Jun. 3, 2002, and/or cited elsewhere are hereby incorporated by reference as if set forth in their entirety herein as follows: EP 0 798 065A2 published Oct. 1, 1997; U.S. Pat. No. 5,829,927 issued Nov. 3, 1998; EP 1 002 608 A published May 24, 2000; U.S. Pat. No. 4,913,604 A issued Apr. 3, 1990; U.S. Pat. No. 5,685,670 A issued Nov. 11, 1997; U.S. Pat. No. 5,915,895 A issued Jun. 29, 1999; and GB 1 092 663 A published Nov. 29, 1967.

The corresponding foreign and international patent publication applications, namely, Federal Republic of Germany Patent Application No. 101 59 512.3, filed on Dec. 4, 2001, having inventor Horst JÄGER, and DE-OS 101 59 512.3 and DE-PS 101 59 512.3, and International Application No. PCT/EP02/13572, filed on Dec. 2, 2002, having WIPO Publication No. WO03/047799 and inventor Horst JÄGER, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of milling cutters and parts therefor may possibly be found in the following U.S. patents: U.S. Pat. No. 6,231,281 B1, issued to Nishikawa on May 15, 2001; U.S. Pat. No. 6,220,795 B1, issued to Matthews on Apr. 24, 2001; U.S. Pat. No. 6,217,262 B1, issued to Wright on Apr. 17, 2001; U.S. Pat. No. 6,176,648 B1, issued to Mizutani on Jan. 23, 2001; U.S. Pat. No. 6,158,927, issued to Cole et al. on Dec. 12, 2000; U.S. Pat. No. 6,146,059, issued to Rohr on Nov. 14, 2000; U.S. Pat. No. 6,109,838, issued to Rivière on Aug. 29, 2000; U.S. Pat. No. 6,042,308, issued to Schmitt on Mar. 28, 2000; U.S. Pat. No. 5,967,706, issued to Hughes, Jr. on Oct. 19, 1999; U.S. Pat. No. 5,957,628, issued to Bentjens et al. on Sep. 28, 1999; U.S. Pat. No. 5,934,842, issued to Gupta on Aug. 10, 1999; U.S. Pat. No. 5,919,008, issued to Shimomura on Jul. 6, 1999; U.S. Pat. No. 5,899, 642, issued to Berglöw et al. on May 4, 1999; U.S. Pat. No. 5,868,529, issued to Rothballer et al. on Feb. 9, 1999; U.S. Pat. No. 5,848,858, issued to Jager et al. on Dec. 15, 1998; U.S. Pat. No. 5,820,308, issued to Hoefler on Oct. 13, 1998; U.S. Pat. No. 5,762,452, issued to Mina on Jun. 9, 1998; U.S. Pat. No. 5,672,031, issued to Oles on Sep. 30, 1997; U.S. Pat. No. 5,542,795, issued to Mitchell on Aug. 6, 1996; U.S. Pat. No. 5,542,794, issued to Smith et al. on Aug. 6, 1996; U.S. Pat. No. 5,529,439, issued to Werner et al. on Jun. 25, 1996; U.S. Pat. No. 4,990,035, issued to Scheuch et al. on Feb. 5, 1991; U.S. Pat. No. 4,938,638, issued to Hessman et al. on Jul. 3, 1990; U.S. Pat. No. 4,930,949, issued to Giessler on Jun. 5, 1990; U.S. Pat. No. 4,848,978, issued to Keritsis on Jul. 18, 1989; U.S. Pat. No. 4,799,838, issued to Kubo et al. on Jan. 24, 1989; U.S. Pat. No. 4,789,273, issued to Wiacek et al. on Dec. 6, 1988; U.S. Pat. No. 4,729,697, issued to Lacey on Mar. 8, 1988; U.S. Pat. No. 4,728,228, issued to Okunishi et al. on Mar. 1, 1988; U.S. Pat. No. 4,627,771, issued to Kieninger on Dec. 9, 1986; U.S. Pat. No. 4,623,284, issued to Greiff on Nov. 18, 1986; U.S. Pat. No. 4,533,282, issued to Lindlar et al. on Aug. 6, 1985; U.S. Pat. No. 4,519,731, issued to Jester et al. on May 28, 1985; U.S. Pat. No. 4,493,594, issued to Okada on Jan. 15, 1985; U.S. Pat. No. 4,461,602, issued to Zettl on Jul. 24, 1984; U.S. Pat. No. 4,359,299, issued to Sagarian on Nov. 16, 1982; U.S. Pat. No. 4,204,787, issued to McCray et al. on May 27, 1980; U.S. Pat. No. 4.097,174, issued to Heinlein on Jun. 27, 1978; U.S. Pat. No. 4,093,392, issued to Hopkins on Jun. 6, 1978; U.S. Pat. No. 4,061,076, issued to Robertson on Dec. 6, 1977; U.S. Pat. No. 4,050,129, issued to Jester et al. on Sep. 27, 1977; and U.S. Pat. No. 4,050,128, issued to Lange on Sep. 27, 1977. The preceding U.S. patents are included for background purposes only.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drilling and chamfering arrangement for drilling and chamfering a countersunk hole in a workpiece, said arrangement comprising:
   a drill body;
   at least one cutting insert having a trapezoid shape and being configured and disposed to cut a countersunk hole;
   said at least one cutting insert comprising a first cutting insert comprising:
      a trapezoid-shaped upper side and a trapezoid-shaped underside opposite said upper side;
      a first angled side section comprising: a first flank and a first, active cutting edge;

a second angled side section comprising: a second flank and a second, inactive cutting edge disposed diametrically opposite said first, active cutting edge;

a front side section and a back side section disposed opposite one another and between said upper side and said underside;

said back side section being longer than said front side section; and said back side section comprising a guide recess disposed to adjoin said underside;

a chamfering collar being disposed around said drill body and being removably attached to said drill body;

said chamfering collar comprising at least one seat being configured to seat a cutting insert;

said at least one seat comprising a first seat being configured and disposed to seat said first cutting insert;

said first cutting insert being removably attached to said chamfering collar at said first seat;

said first seat having an interior edge being disposed immediately adjacent said drill body and being disposed to run parallel to said back side section of said first cutting insert;

said first seat comprising a guide projection being disposed to project along a portion of said interior edge of said first seat; and said guide projection being matingly engaged with said guide recess of said first cutting insert to provide a friction fit between said first cutting insert and said first seat, and also being configured and disposed to prevent contact between said drill body and said first cutting insert.

2. The drilling and chamfering arrangement according to claim 1, wherein said first seat of said chamfering collar comprises a support surface that corresponds to said second flank of said first cutting insert.

3. The drilling and chamfering arrangement according to claim 2, wherein said first cutting insert grips said first seat on said support surface at least partly from behind by means of said second flank.

4. The drilling and chamfering arrangement according to claim 3, wherein said first cutting insert comprises a clamping hole with a boring, and said chamfering collar comprises a corresponding threaded boring in said first seat.

5. The drilling and chamfering arrangement according to claim 4, wherein said drilling and chamfering arrangement has a feed direction that runs substantially parallel to the length of said back side section of said first cutting insert.

6. The drilling and chamfering arrangement according to claim 5, wherein:

said first cutting insert has a thickness that is less than one-quarter of a length of said first cutting insert; and said first cutting insert has a width that is less than one-half of the length of said first cutting insert.

7. The drilling and chamfering arrangement according to claim 6, wherein:

said guide recess of said first cutting insert and said guide projection of said first seat extend over at least one-half the length of at least one of: said back side section of said first cutting insert or said interior edge of said first seat; and said guide projection tapers toward a tip of said first seat.

8. The drilling and chamfering arrangement according to claim 7, wherein:

said at least one seat comprises a plurality of seats disposed symmetrically around a longitudinal axis of symmetry of said drilling and chamfering arrangement, said chamfering collar comprises an opening through which said drill body is disposed, which said opening is oriented along the longitudinal axis of symmetry; and said guide projection, when viewed from overhead on said upper side of said first cutting insert held on said first seat, does not extend beyond its contour.

9. A chamfering arrangement for use with a rotary cutting tool, said chamfering arrangement comprising:

at least one cutting insert having a trapezoid shape and being configured to countersink a hole in a workpiece;

said at least one cutting insert comprising a first cutting insert;

said first cutting insert comprising:

a trapezoidal first side and a trapezoidal second side opposite said first side;

a first angled side section comprising: a first flank and a first cutting edge;

a second angled side section comprising: a second flank and a second cutting edge disposed opposite said first cutting edge;

a first side section and a second side section disposed opposite one another and between said first side and said second side;

said second side section being longer than said first side section; and said second side section comprising a guide recess disposed to adjoin said second side;

a chamfering collar being configured to be disposed around a drill body and being configured to be removably attached to a drill body;

said chamfering collar comprising at least one seat;

said at least one seat comprising a first seat being configured and disposed to seat said first cutting insert;

said first cutting insert being removably attached to said chamfering collar at said first seat;

said first seat having a first edge being configured to be disposed immediately adjacent a drill body and being disposed to run parallel to said second side section of said first cutting insert;

said first seat comprising a guide projection being disposed to project along a portion of said first edge of said first seat; and said guide projection being matingly engaged with said guide recess of said first cutting insert to provide a friction fit between said first cutting insert and said first seat, and also being configured and disposed to prevent contact between a drill body and said first cutting insert.

10. The chamfering arrangement according to claim 9, wherein said first seat of said chamfering collar comprises a support surface that corresponds to said second flank of said first cutting insert.

11. The chamfering arrangement according to claim 10, wherein said first cutting insert grips said first seat on said support surface at least partly from behind by means of said second flank.

12. The chamfering arrangement according to claim 11, wherein:

said first cutting insert comprises a clamping hole with a boring, and said chamfering collar comprises a corresponding threaded boring in said first seat; and said chamfering arrangement has a feed direction that runs substantially parallel to the length of said back side section of said first cutting insert.

13. The chamfering arrangement according to claim 12, wherein:

said first cutting insert has a thickness that is less than one-quarter of a length of said first cutting insert; and said first cutting insert has a width that is less than one-half of the length of said first cutting insert.

14. The chamfering arrangement according to claim 13, wherein:
said guide recess of said first cutting insert and said guide projection of said first seat extend over at least one-half the length of at least one of: said back side section of said first cutting insert or said interior edge of said first seat; and
said guide projection tapers toward a tip of said first seat.

15. The chamfering arrangement according to claim 14, wherein:
said at least one seat comprises a plurality of seats disposed symmetrically around a longitudinal axis of symmetry of said chamfering arrangement; and
said guide projection, when viewed from overhead on said upper side of said first cutting insert held on said first seat, does not extend beyond its contour.

16. A trapezoid-shaped cutting insert for use in a cutting tool, said cutting insert comprising:
a trapezoidal first side and a trapezoidal second side opposite said first side;
a first angled side section comprising a first flank and a first cutting edge;
a second angled side section comprising a second flank and a second cutting edge disposed opposite said first cutting edge;
a first side section and a second side section disposed opposite one another and between said first side and said second side;
said second side section being longer than said first side section;
said second side section comprising a guide recess disposed to adjoin said second side; and
said guide recess being configured to be matingly engaged with a guide projection of a seat of a cutting tool body to provide a friction fit between said cutting insert and a cutting tool body.

17. The cutting insert according to claim 16, wherein said cutting insert comprises a clamping hole with a boring to permit clamping of said cutting insert to a seat of a tool body.

18. The cutting insert according to claim 17, wherein said cutting insert has a thickness that is less than one-quarter of its length.

19. The cutting insert according to claim 18, wherein said cutting insert has a width that is less than one-half of its length.

20. The cutting insert according to claim 19, wherein said guide recess extends over at least one-half the length of said second side section.

* * * * *